(12) United States Patent
Yip

(10) Patent No.: US 10,226,676 B2
(45) Date of Patent: Mar. 12, 2019

(54) BEER PONG GAMING SYSTEM AND AUTOMATIC SCORING SYSTEM FOR BEER PONG GAME

(71) Applicant: Ka Hing Steven Yip, Kowloon (HK)

(72) Inventor: Ka Hing Steven Yip, Kowloon (HK)

( * ) Notice: Subject to any disclaimer, the term of this patent is extended or adjusted under 35 U.S.C. 154(b) by 0 days.

(21) Appl. No.: 15/486,324

(22) Filed: Apr. 13, 2017

(65) Prior Publication Data

US 2018/0221741 A1    Aug. 9, 2018

(51) Int. Cl.
```
A63F 9/24      (2006.01)
A63B 67/06     (2006.01)
A63B 63/08     (2006.01)
A63B 71/06     (2006.01)
H04B 5/00      (2006.01)
```

(52) U.S. Cl.
CPC .............. *A63B 67/06* (2013.01); *A63B 63/08* (2013.01); *A63B 71/0605* (2013.01); *A63B 71/0669* (2013.01); *H04B 5/0062* (2013.01); *A63B 2067/061* (2013.01); *A63B 2225/54* (2013.01); *A63B 2225/682* (2013.01); *A63F 2250/024* (2013.01)

(58) Field of Classification Search
CPC ................................ A63B 63/08; A63B 67/06
See application file for complete search history.

(56) References Cited

U.S. PATENT DOCUMENTS

| | | | | |
|---|---|---|---|---|
| 8,282,457 B1 * | 10/2012 | Edwards | ................ | A63B 71/06 273/309 |
| 2004/0188942 A1 * | 9/2004 | Trokan | ................. | A63F 7/0017 273/342 |
| 2006/0226606 A1 | 10/2006 | Finley et al. | | |
| 2010/0058958 A1 * | 3/2010 | Christian | ............. | A47B 3/0912 108/19 |
| 2010/0244384 A1 * | 9/2010 | Hoffer | .................... | A63B 67/06 273/342 |
| 2012/0013073 A1 * | 1/2012 | Wyland | ................ | A63B 67/002 273/287 |
| 2016/0038808 A1 * | 2/2016 | Lombardi | ............. | A63B 67/06 463/7 |

FOREIGN PATENT DOCUMENTS

| | | |
|---|---|---|
| CN | 201610544425.8 | 7/2016 |
| WO | WO2011105983 A1 | 9/2011 |
| WO | WO20120009529 A2 | 1/2012 |

* cited by examiner

*Primary Examiner* — Steve Rowland
(74) *Attorney, Agent, or Firm* — Muncy, Geissler, Olds & Lowe, P.C.

(57) ABSTRACT

The present disclosure provides a beer pong game system comprising a game table, a plurality of game cups, and at least one game ball, the game table being equipped with an RFID reader and a plurality of RFID antennas, the RFID antennas one-to-one corresponding to to-be-detected positions of the game cups; an electronic tag being affixed at a bottom of a game cup; an electronic tag being inlaid inside the game ball; the beer pong game system being characterized in comprising a make detecting unit that identifies, at predetermined to-be-detected positions of game balls, the electronic tags of the game balls by scanning corresponding RFID antennas, thereby determining a make result and prompting a first landing mode; and a cup-removal scoring unit that identifies, at to-be-detected positions of all game cups, electronic tags of the game cups by scanning all RFID antennas, thereby inferring a second landing mode and correspondingly scoring.

5 Claims, 18 Drawing Sheets

Fig.6A (make logic – 1)
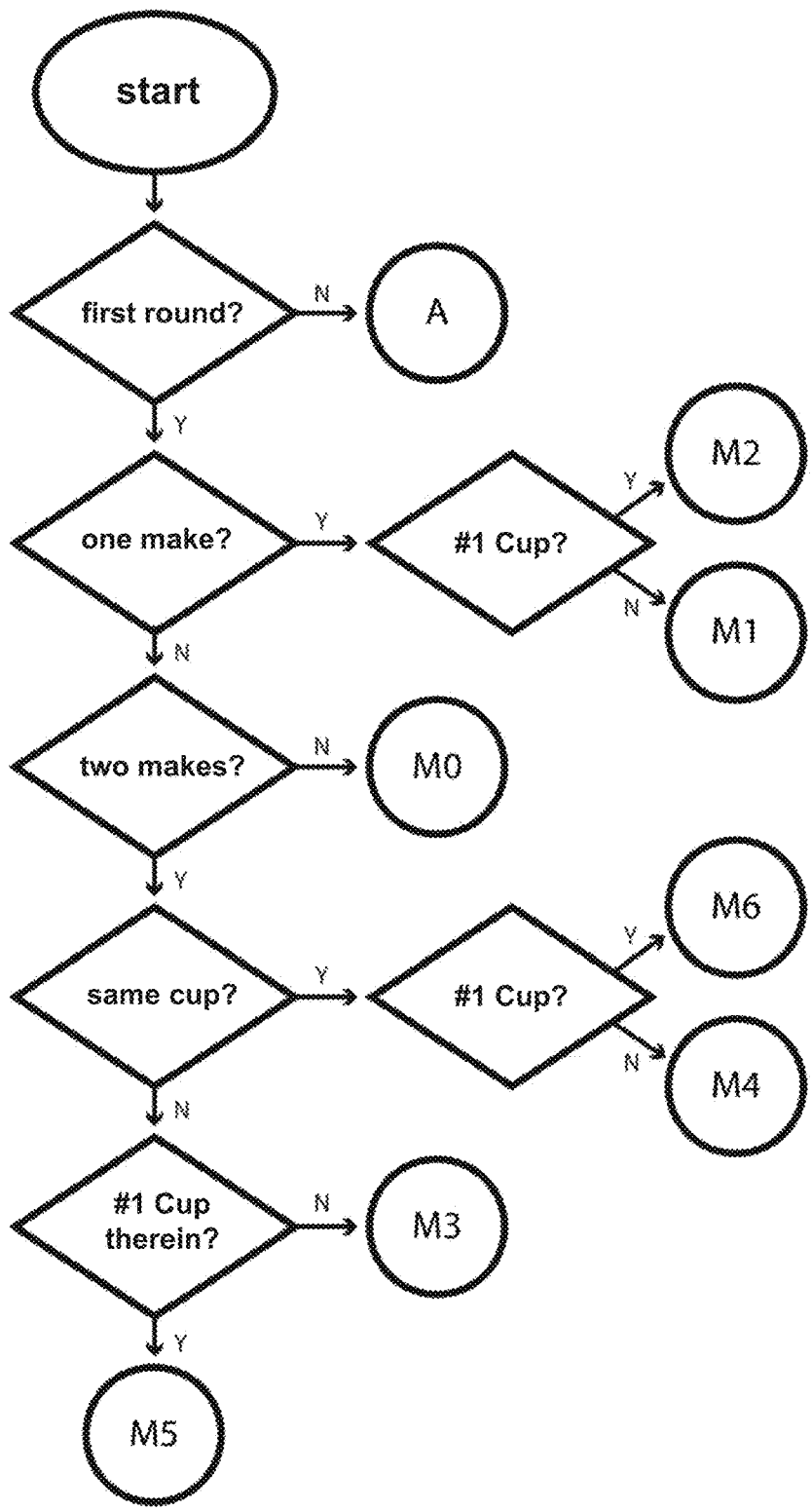

Fig.6B (make logic – 2)
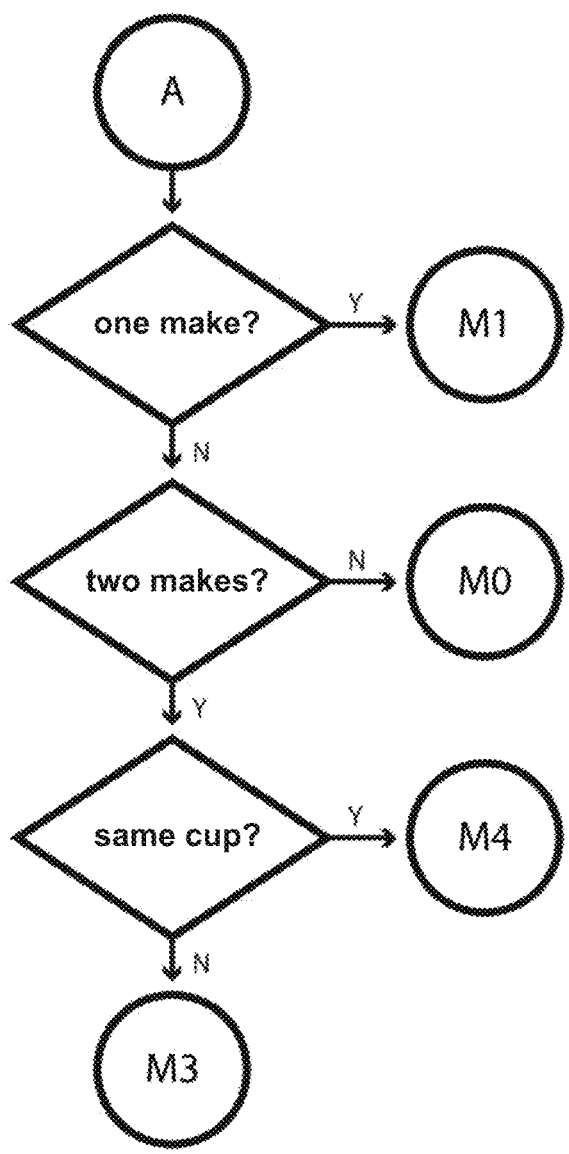

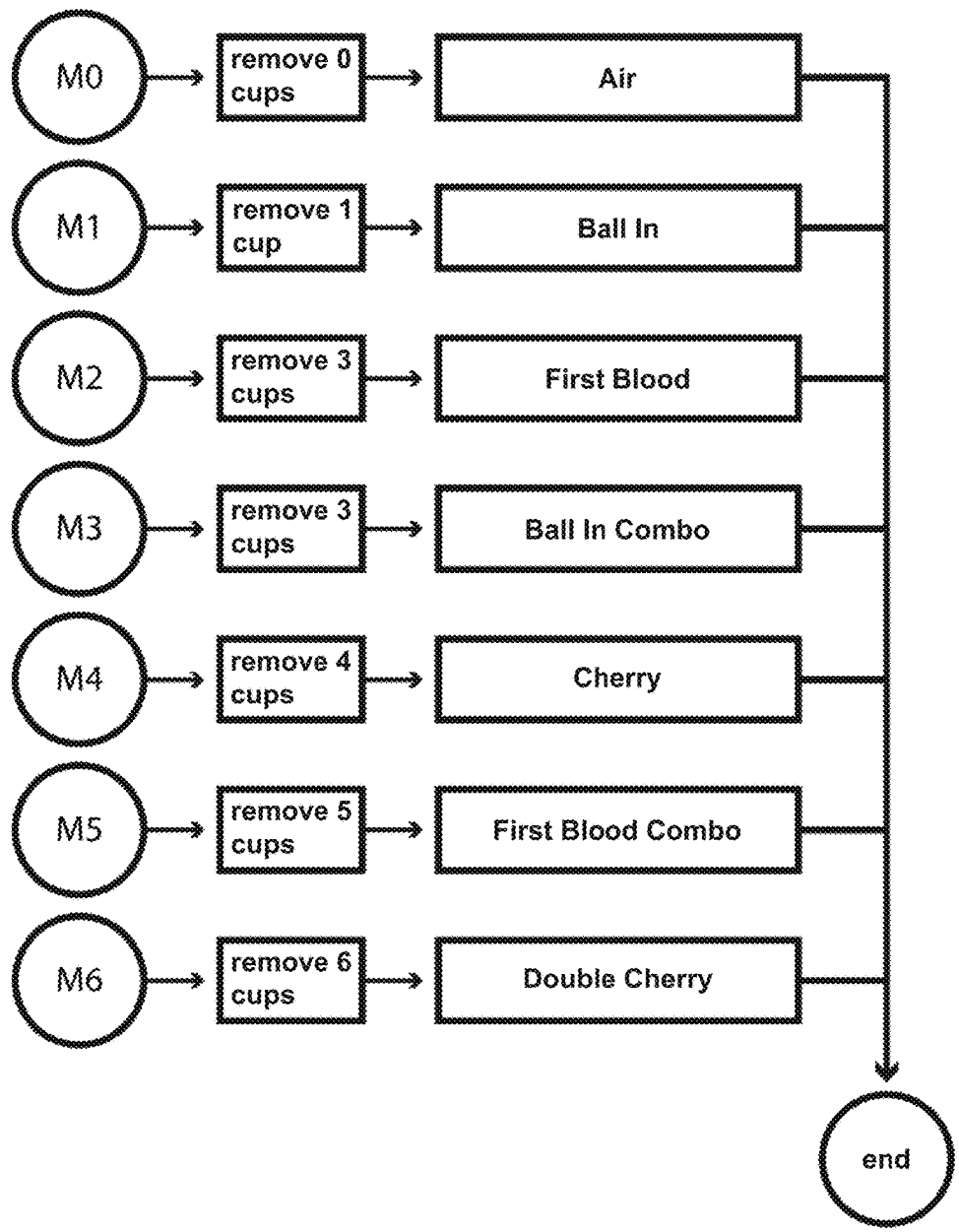
Fig.6C (make logic – 3)

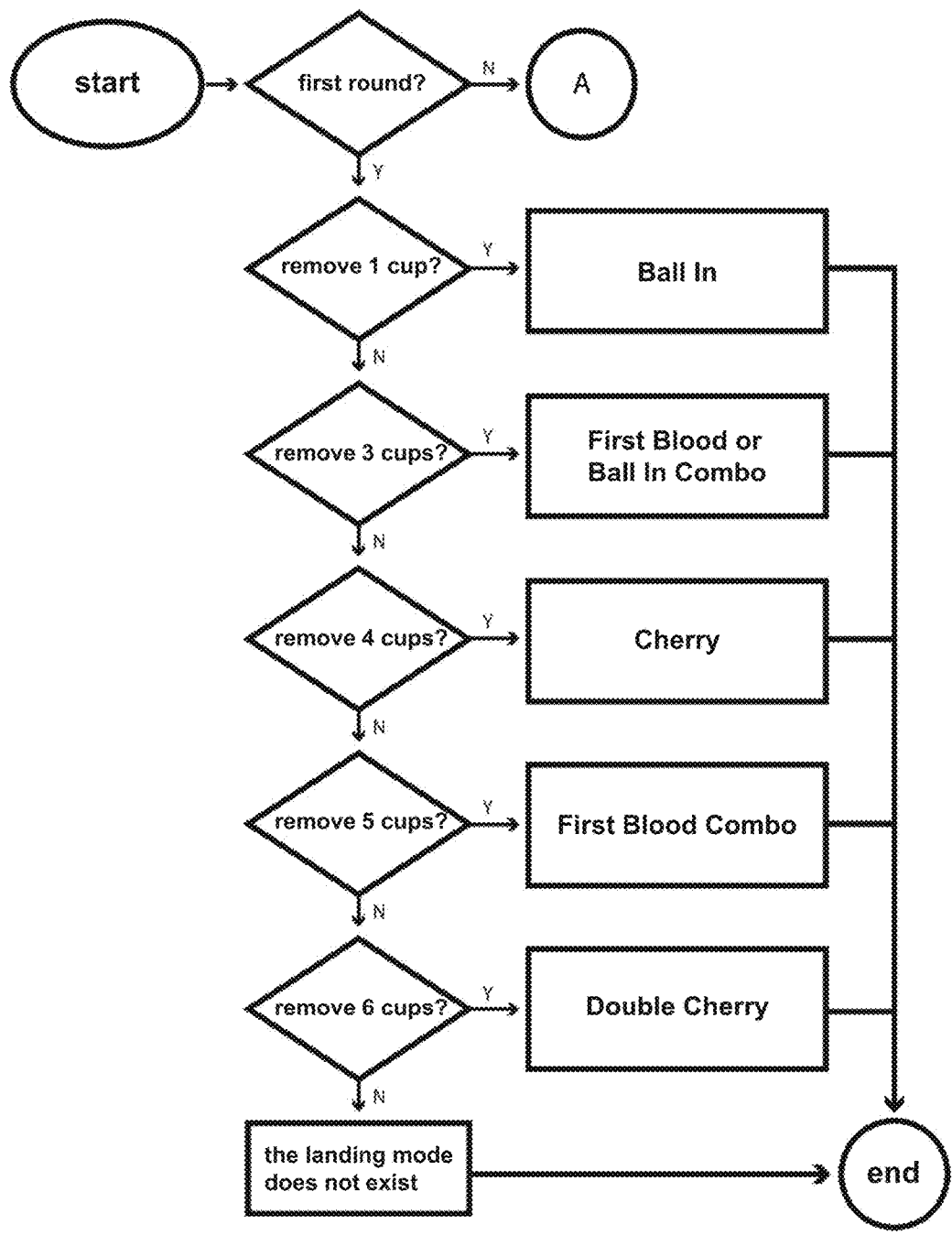
Fig.7A (cup-removal logic – 1)

Fig.7B (cup-removal logic – 2)
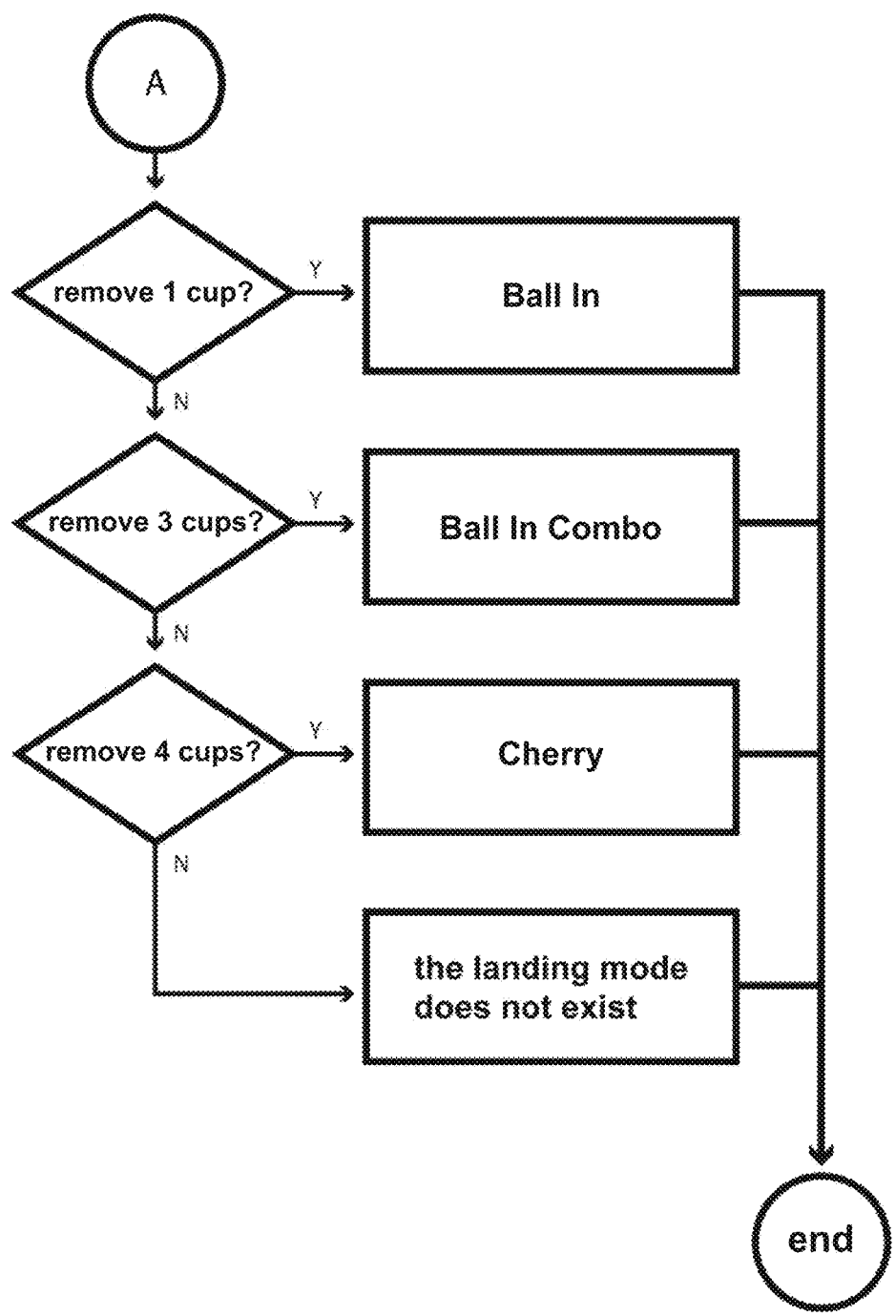

BEER PONG GAMING SYSTEM AND AUTOMATIC SCORING SYSTEM FOR BEER PONG GAME

FIELD OF THE INVENTION

The present invention relates to a beer pong game system having an automatic scoring function and an automatic scoring system for the beer pong game, and particularly relates to a beer pong game system having a score checking function based on a radio frequency identification technology.

BACKGROUND OF THE INVENTION

A traditional beer pong game has a drawback that a make (that a ball lands in a cup is known as a "make") cannot be automatically detected, which needs to be determined by a player with the naked eye. Therefore, when a player successfully lands a ball, the traditional beer pong game cannot automatically score like a common electronic game in the market, such that it cannot automatically play music or display an animation according to a make condition or a scoring result so as to evoke the ambience of game and enhance the fun of participating in the game. In order to solve this problem, a prior patent application (CN201610544425.8/HK16108165.4) of the same inventor discloses a beer pong game system having make detecting and automatic scoring functions, which enables automatic make detecting and scoring using a radio frequency identification (RFID) technology. The beer pong game system arranges an RFID reader and a plurality of RFID antennas with a game table and also provides a plurality of game cups affixed with button-type electronic tags at bottoms thereof as well as game balls inlaid with coiled electronic tags. The beer pong game system uses the RFID reader and RFID antennas to respectively detect the electronic tags in the game cups and game balls during each game round, thereby determining a relative position state between a game cup and a game ball to judge a make or not and meanwhile completing automatic scoring based on the number of makes and landing positions during each round and whether it is a first round (i.e., based on a landing mode).

It is seen that in the beer pong game system, the make detecting function and the automatic scoring function are synchronously and inseparably implemented; therefore, the beer pong game system does not have a score checking or error correcting function. Further, the beer pong game system that implements the make detecting function and the automatic scoring function synchronously and inseparably, although tallying with the habit of thinking of a common game player in implementation logic, has the following drawbacks: firstly, a coiled electronic tag inlaid inside a game ball has a blind point in measurement angle relative to a posture of an RFID antenna, such that make detection failure will be caused at a specific posture, which inevitably incurs a scoring error; secondly, the game ball is frequently in a moving state while the game cup is substantially in a static state, such that a circular electronic tag inlaid inside the game ball might be incidentally damaged due to factors such as impact or vibration, consequently losing the make detecting function and automatic scoring function, which will cause complete crash of the entire beer pong game system; thirdly, the RFID-based beer pong game automatic scoring system has a rather complex overall structure and a high cost; besides, it can only be applied to a dedicated ping pong game inlaid with an RFID electronic tag. Therefore, it is desired to provide a simplified version that may be directly applied to a common ping pong game with a low-cost scoring technology.

SUMMARY OF THE INVENTION

An objective of the present invention is to solve the various drawbacks in the existing beer pong game system. By separately implementing the make detecting function and the scoring function, a score checking (error correction) function for the beer pong game is added; besides, occurrence of disability of the whole beer pong game system only due to invalidity of the electronic tag in a game ball is avoided. Another objective of the present invention is to provide a simplified beer pong game system that enables automatic scoring at a lower cost.

In order to achieve the objectives above, a technical solution of the present invention is to provide a beer pong game system comprising a game table, a plurality of game cups, and at least one game ball, the game table being equipped with an RFID reader and a plurality of RFID antennas, the RFID antennas one-to-one corresponding to to-be-detected positions of the game cups; an electronic tag being affixed at a bottom of a game cup; an electronic tag being inlaid inside the game ball; the beer pong game system being characterized in comprising a make detecting unit that identifies, at predetermined to-be-detected positions of game balls, the electronic tags of the game balls by scanning corresponding RFID antennas, thereby determining a make result and prompting a first landing mode; and a cup-removal scoring unit that identifies, at to-be-detected positions of all game cups, electronic tags of the game cups by scanning all RFID antennas, thereby inferring a second landing mode and correspondingly scoring.

Preferably, in the beer pong game system according to the technical solution above, in a first round of beer prong game, the predetermined game cups refer to all of the game cups; in a non-first-round of beer pong game, the predetermined game cups refer to remaining game cups after a cup-removal operation in an immediately preceding round of game.

Preferably, the beer pong game system according to the technical solution above further comprises: a cup-removal mode switching unit that causes the cup-removal scoring unit to switch between an automatic cup-removal mode and a manual cup-removal mode, wherein in the automatic cup-removal mode, the cup-removal scoring unit requires a user to correspondingly perform a cup-removal operation according to the first landing mode prompted by the make detecting unit, and in the manual cup-removal mode, the cup-removal scoring unit allows the user to autonomously determine the cup-removal operation.

Preferably, in the beer pong game system according to the technical solution above, the make detecting unit prompts the first landing mode according to a make logic, and the cup-removal scoring unit infers the second landing mode according to the cup-removal logic.

Preferably, in the beer pong game system according to the technical solution above, in the case of inferring the second landing mode according to the cup-removal logic, the cup-removal scoring unit requires confirmation from the user; if the second landing mode cannot be inferred according to the cup-removal logic, the cup-removal scoring unit displays alarm information.

According to the technical solution above of the present invention, because the make detecting unit and the cup-removal scoring unit of the beer pong game system are implemented separately and independently, particularly the cup-removal scoring unit does not completely rely on the electronic tag in a game ball, a scoring error caused by a blind point at a measurement angle is reliably avoided. Further, system abnormalities such as possible invalidity of an electronic tag in a game ball may be promptly known through the cup-removal switching unit of the beer pong game system.

Another technical solution of the present invention provides an automatic scoring system for a beer pong game, comprising: a game table equipped with a detector; and a plurality of game cups as detected objects, wherein the automatic scoring system calculates a make score based on the number of game cups detected by the detector and reversely infers a corresponding landing mode.

Preferably, in the automatic scoring system for a beer pong game according to the technical solution above, the detector is based on a radio frequency identification (RFID) technology and comprises an RFID reader and an RFID antenna, an electronic tag being affixed to a bottom of the game cup for the RFID reader to identify.

Preferably, in the automatic scoring system for a beer pong game according to the technical solution above, the detector is based on an infrared reflection technology and comprises an infrared transceiver, a reflective surface being provided at the bottom of the game cup for the infrared transceiver to identify.

Preferably, in the automatic scoring system for a beer pong game according to the technical solution above, the detector is based on a magnetic force sensing technology and comprises a magnetic sensor, a magnet being provided at the bottom of the game cup for the magnetic sensor to identify.

Preferably, in the automatic scoring system for a beer pong game according to the technical solution above, the detector is based on a capacitance detection technology and comprises a capacitance detection PCB, whether a game cup exists being determined based on capacitance change above a to-be-detected position.

The technical solution of the present invention is capable of providing a simplified beer pong game version with a low-cost detection technology, which is suitable for household use; particularly, the automatic scoring system for the beer pong game may directly use a common ping pong ball purchased easily from the market, which avoids high-cost and inconvenience in replacing consumables and maintenance.

The features, technical effects and other advantages of the present invention will become obvious through further illustration with the accompanying drawings.

BRIEF DESCRIPTION OF THE ACCOMPANYING DRAWINGS

Hereinafter, the present invention will be described in an exemplary manner, in which:

FIGS. 6A-6C are schematic diagrams of landing modes based on make logics in a beer pong game;

FIGS. 7A and 7B are schematic diagrams of landing modes based on cup-removal logics in a beer pong game;

DETAILED DESCRIPTION OF THE PREFERRED EMBODIMENTS

Hereinafter, technical contents, structural features, and to-be-achieved technical objectives and technical effects of the preferred embodiments of the present invention will be illustrated in detail with reference to the accompanying drawings.

Figure 1:
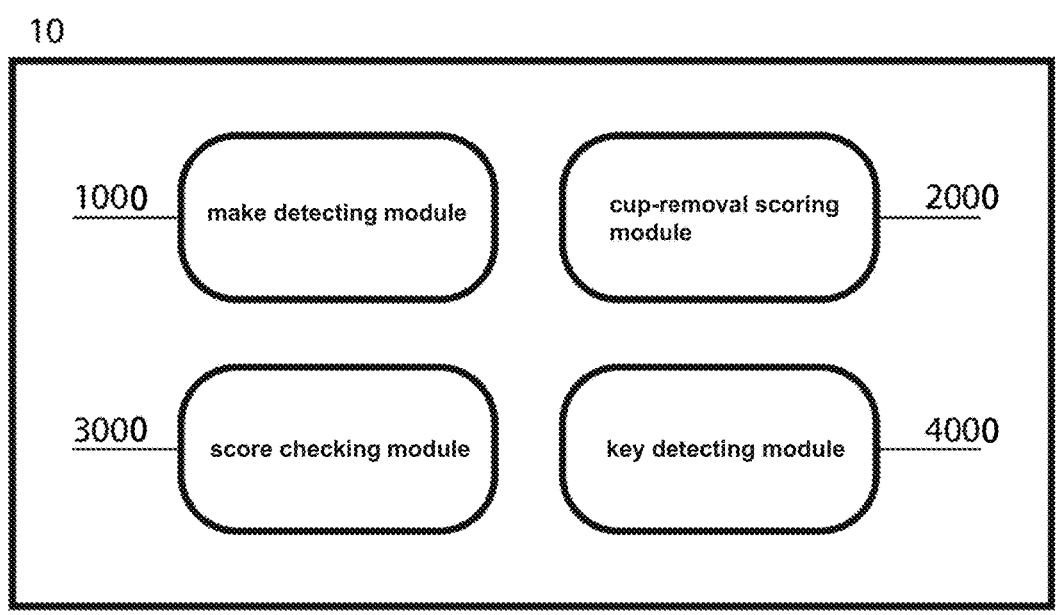
FIG. 1 is a diagram showing functional modules of a beer pong game system according to embodiments of the present disclosure.

FIG. 1 is a diagram showing functional modules of a beer pong game system according to embodiments of the present disclosure. As illustrated in FIG. 1, a beer pong game system 10 having a score checking function based on a radio frequency identification technology comprises: a make detecting module 1000, a cup-removal scoring module 2000, a score checking module 3000, and a key detecting module 4000. The make detecting module 1000 is for detecting, in an error tolerance manner, various types of possibly appearing landing modes, the cup-removal scoring module 2000 is for manually performing a cup-removal operation and completing make scoring according to game rules when a user does not acknowledge a landing mode detected by the make detecting module 1000. The score checking module 3000 is for checking whether the user performs a predicted cup-removal operation according to the landing mode detected by the make detecting module 1000. The key detecting module 4000 is for detecting whether the user presses a corresponding key to perform human-machine interaction and mode switching of the beer pong game system. For the sake of distinctness, hereinafter, a mode in which the user strictly carries out the cup-removal operation predicted by the system is referred to as an automatic cup-removal mode, and a mode in which the user carriers out a cup-removal operation autonomously based on game rules is referred to as a manual cup-removal mode. The user may switch between the automatic cup-removal mode and the manual cup-removal mode through the key detecting module 400.

It should be particularly noted that the make detecting module 1000 and the cup-removal scoring module 2000 are respectively implemented by mutually independent subsystems, which is also unique to the present invention in contrast to existing RFID-based beer pong game systems: even a landing mode detection error occurs to the make detecting module 1000, it may be corrected by the cup-removal scoring module 2000, which will be depicted in further detail infra. In a preferred embodiment of the present invention, the make detecting module 1000 and the cup-removal scoring module 2000 are implemented by a RFID-based make detecting sub-system and a cup-removal scoring sub-system, respectively. Hereinafter, their components and working principles will be illustrated in detail with reference to FIGS. 2-5.

Figure 2:
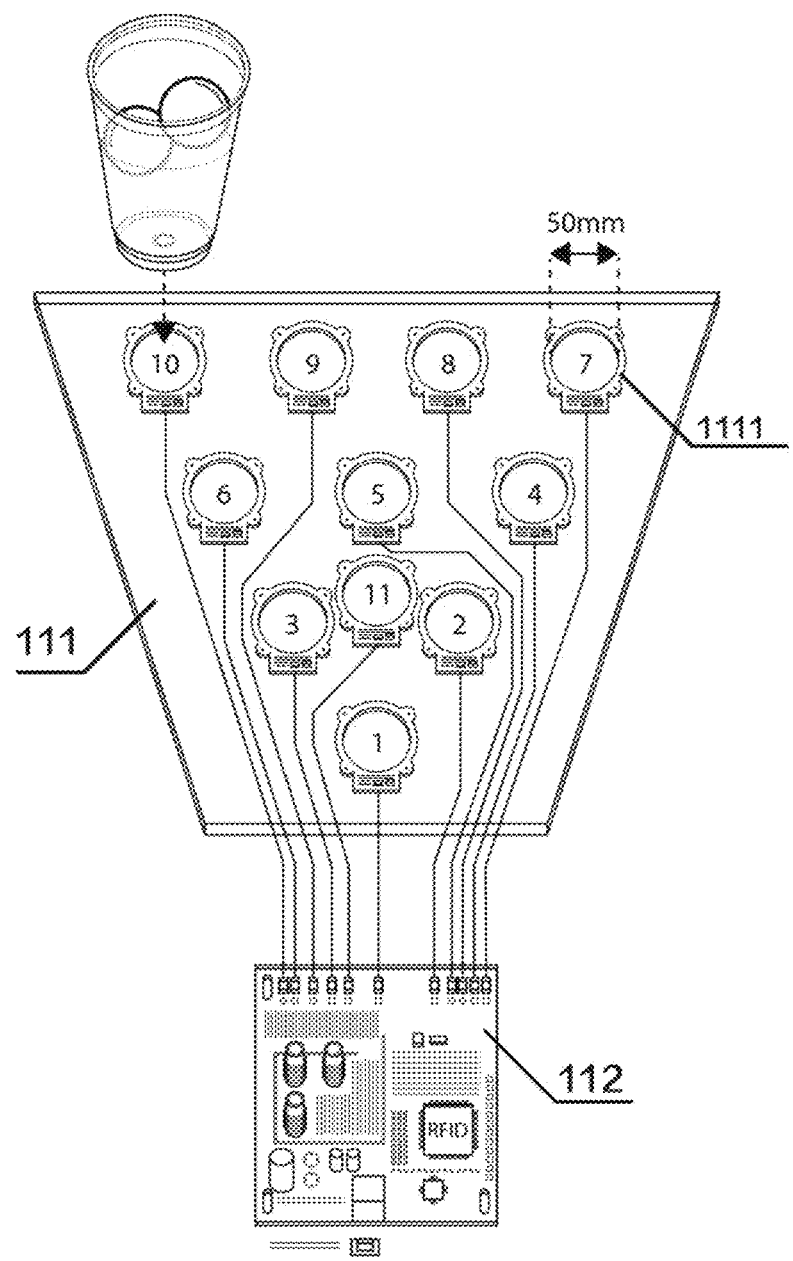
FIG. 2 is a structural diagram of a make detecting sub-system of a beer pong game system according to embodiments of the present invention.

FIG. 2 is a structural diagram of a make detecting sub-system of a beer pong game system 10 of the present invention, which shows logical relationships and physical relationships between respective components forming the RFID make detecting sub-system. FIG. 2 only schematically shows one game cup at position 10. However, during an actual game process, the number of game cups ranges from 1 to 10, and formation of the game cups may be re-arranged based on game rules. Additionally, although each playing party uses 10 game cups at the start of a game, there exist 11 to-be-detected cup positions numbered 1~11 shown in FIG. 2 in accordance with rules of the bear pong game. To facilitate players to place the game cups at appropriate positions, an RGB light-emitting sheet is preferably provided respectively at the 11 to-be-detected cup positions so as to guide player. As shown in FIG. 2, the RFID make detecting sub-system comprises: an organic glass board 111 with circular RFID antennas 1111 corresponding provided at the to-be-detected cup positions; and an RFID reader 112 as a multi-path adapter connected to the circular RFID antennas 1111 through co-axial cables, respectively, the RFID reader 112 being further connected to a computer through a USB cable or the like so as to process the read data. The RFID make detecting sub-system further comprises: a plurality of game cups 200 affixed with RFID tags at bottoms thereof and at least one game ball 300 having an RFID tag inlaid inside. For the sake of simplicity, only one game cup 200 is schematically shown at position 10, and two game balls 300 are shot therein. Structural details of the game cup 200 with the RFID tag and the game ball 300 with the RFID tag will be illustrated hereinafter.

Figure 3:
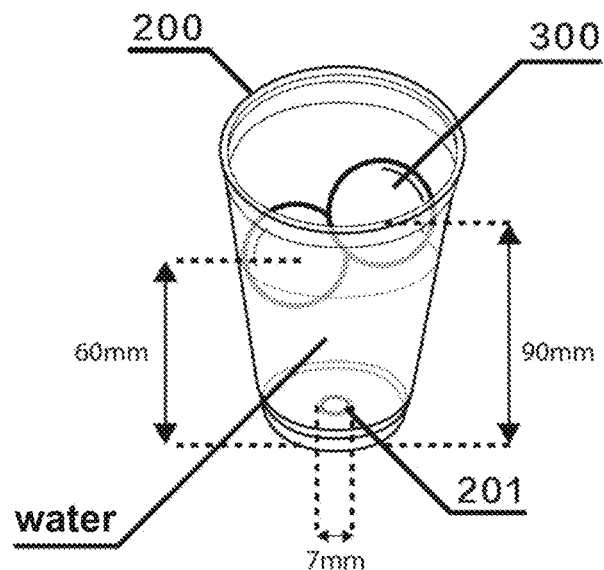
FIG. 3 is a schematic diagram of a usage state of a game cup in the make detecting subsystem shown in FIG. 2.

FIG. 3 is a schematic diagram of a usage state of a game cup 200 used in an RFID make detecting sub-system in which two games balls 300 have been landed. During an actual beer pong game process, at most two game balls 300 will land in the game cup 200. As illustrated in FIG. 3, a water level in the game cup 200 during the game is about 60 mm; a height of a center of the game ball 300 that first lands and drifts on a liquid surface in the game cup 200 from the bottom of the cup is about 60 mm, while a height of the center of the game ball 300 that lands later from the bottom of the cup is about 90 mm. Because a passive electronic tag is inlaid at the center of the respective two game balls 300, a height of the electronic tag in the game ball 300 at a lower position in the figure from the RFID antenna is about 60 mm, while a height of the electronic tag in the game ball 300 at a higher position from the RFID antenna is about 90 mm. According to the preferred embodiments of the present invention, a 13.56 MHz high-frequency RFID product is selected such that a reading range of the RFID reader 112, i.e., the working range of the RFID 1111, is 0-11 cm. In this way, throughout the entire beer pong game process, no matter whether it is one or two game balls 300 landing into the game cup 200, they can be reliably detected by the RFID antenna so as to determine a make condition (i.e., determining a make logic). In addition, the game cup 200, which is of a standard inverted frustum-conical shape, has a body height of about 135 mm and a bottom diameter of about 60 mm; besides, the bottom of the cup is affixed with a plastic button-type circular tag 201. Specifically, the circular tag 201 is a 7 mm circular tag conforming to the ISO15693 standard. This size causes the electronic tag of the game ball 200 to be located only within a working zone of the corresponding RFID antenna, such that it will not be simultaneously detected by a plurality of RFID antennas.

Figure 4:
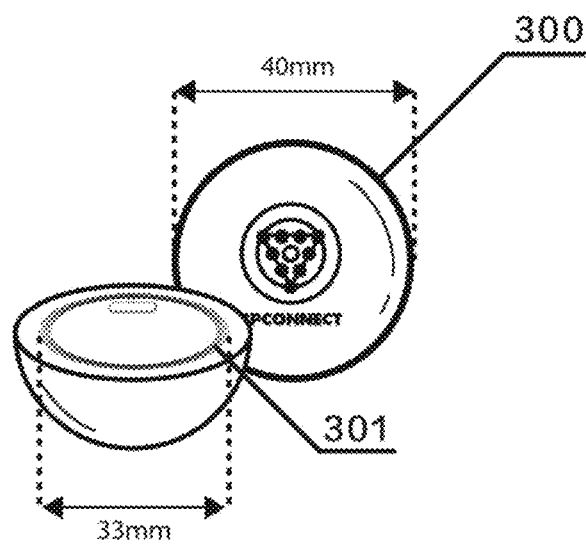
FIG. 4 is a sectional view of a game ball in the make detecting sub-system shown in FIG. 2.

FIG. 4 is a sectional view of a game ball 300 in the make detecting sub-system. As shown in FIG. 4, a standard diameter of the game ball 300 is 40 mm. A coiled electronic tag 301 or alternatively an inlay tag is inlaid in the center of the game ball 300. Specifically, the coiled electronic tag 301 is a 33 mm circular tag conforming to the ISO15693 standard. It should be noted that the electronic tag 201 of the game cup 200 and the electronic tag 301 of the game ball 300 not only have different sizes but also have different content defined values. Specifically, their data storage format identifier (DSFIDs) are different, so are their application family identifiers (AFIs). The RFID reader 112 determines whether they are game cups or game balls by using DSFID value, and the AFI is for causing tags of certain category designated by the RFID reader 112 to be detected. Additionally, the electronic tag of each game cup 200 and game ball 300 has a unique identification code (UID), for recording a correspondence relationship between a game cup 200 or a game ball 300 and a target antenna when the computer performs an RFID make detection, so as to accurately determine various landing modes possibly occurring during a game process.

Figure 5:
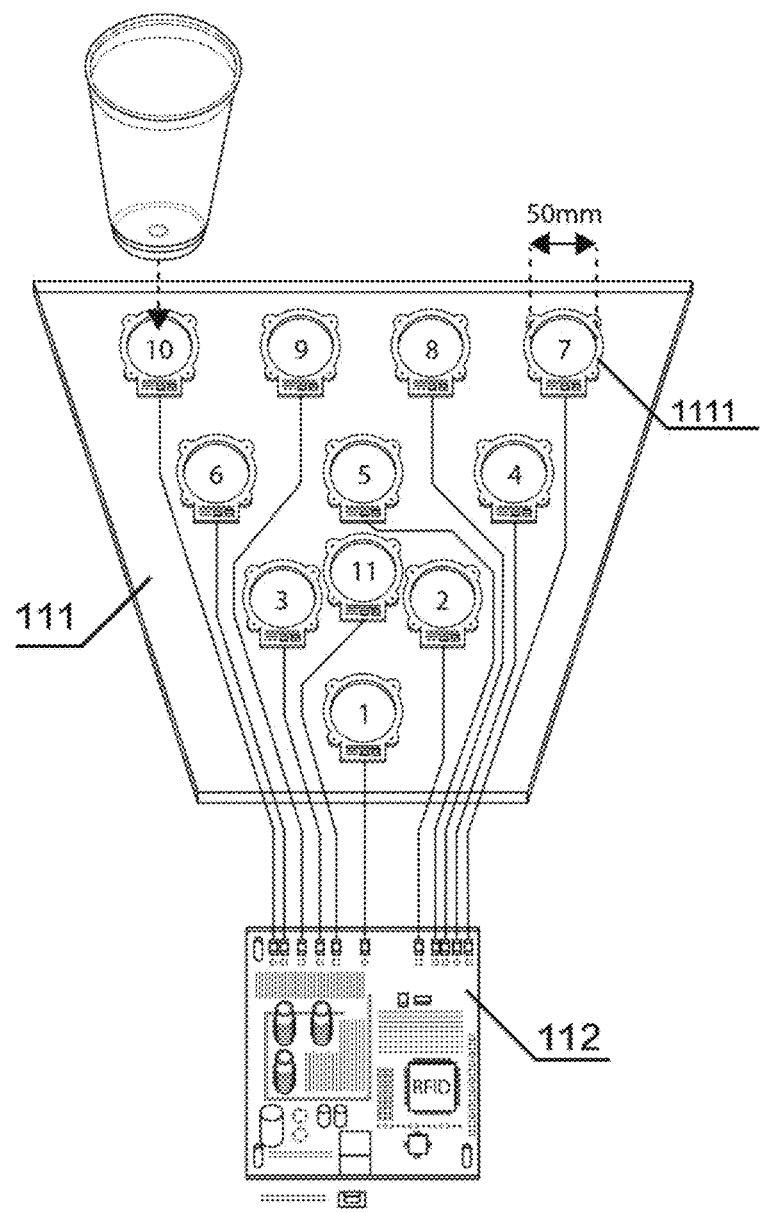
FIG. 5 is a structural diagram of a cup-removal scoring sub-system of a beer pong game system according to embodiments of the present invention.

FIG. 5 is a structural diagram of a cup-removal scoring sub-system of a beer pong game system 10 according to the present invention. In contrast with the structure of the RFID make detection sub-system, the RFID cup-removal scoring sub-system does not have the game 300 with an RFID electronic tag inlaid inside. As mentioned above, because the electronic tag 201 affixed to the bottom of the game cup 200 has a smaller diameter, the RFID antenna 1111 at each to-be-detected position will not simultaneously detect the electronic tag of the same game cup 200, such that it can be reliably determined whether the game cup 200 exists at the position of a certain RFID antenna 1111. By detecting the game cups 200 removed by the user during each round (i.e., detecting a cup-removal logic), a score may be reliably calculated and a corresponding landing mode may be inferred. Other components comprised in the RFID cup-removal scoring sub-system are completely identical to the RFID make detection sub-system in structure and function, depictions of which are thus omitted here.

Those skilled in the art will easily appreciate that because the RFID cup-removal scoring sub-system does not involve a game ball 300 inlaid with an RFID tag, the beer pong game system 10 according to the preferred embodiments of the present disclosure may still continue working and score a make even when the electronic tag in the game ball 300 is incidentally invalidated, without causing the entire game system to completely crash like an existing beer pong game system. Further, a simplified beer pong game system 10 only having an RFID cup-removal scoring sub-system may also be provided according to the present invention. Although the simplified beer pong game system 10 cannot automatically detect a landing mode based on the make logic without the RFID make detecting sub-system, the landing mode may be still inferred by the RFID cup-removal scoring sub-system based on the cup-removal logic, thereby scoring the make.

Hereinafter, a relationship between the make logic/cup-removal logic and the landing mode of the beer pong game will be simply illustrated with reference to the accompanying drawings. As mentioned above, to which kind of landing mode a make situation in a certain game round belongs is determined based on a current round state (i.e., first round or not), specific positions of landing, and the number of makes; therefore, the landing mode may be exactly known based on the make logic. FIGS. 6A-6C are schematic diagrams of landing modes based on make logics in a beer pong game. In the drawings, for the sake of distinctness, different names of landing modes are used according to beer pong game rules (e.g., "First Blood"). These contents have no direct relationship with the technical solution of the present invention, and detailed depictions thereof are omitted.

FIGS. 7A and 7B are schematic diagrams of landing modes based on cup-removal logics in a beer pong game. As illustrated in the drawings, after twice shooting is completed in each round, according to the condition of removed game cups, not only the make score may be calculated, the corresponding landing mode may also be inferred. Therefore, a simple and reliable reversely-deduced cup-removal scoring manner may be provided by detecting the number of removed game cups with an electronic tag affixed at bottoms thereof using the RFID technology. In other words, the RFID technology may not only be employed to detect a landing mode, but also may be employed to infer a landing mode; particularly if a landing mode detected by the system but unacknowledged by the user continuously appears such that corrections are needed by human-machine interaction or switching a cup-removal mode, the system may determine that a fault occurs to the electronic tag in the game ball and will promptly alarm the user. It should be supplemented that in the case of inferring a landing mode based on a cup-removal logic, in special but rare circumstances, the two landing modes (i.e., Ball in Combo and First Blood) in the first round cannot be exactly distinguished; however, this will not affect calculation of the final score. Therefore, the two landing modes may be combined to be processed; alternatively, they may be resolved by user intervention through human-machine interaction.

Figure 8A:
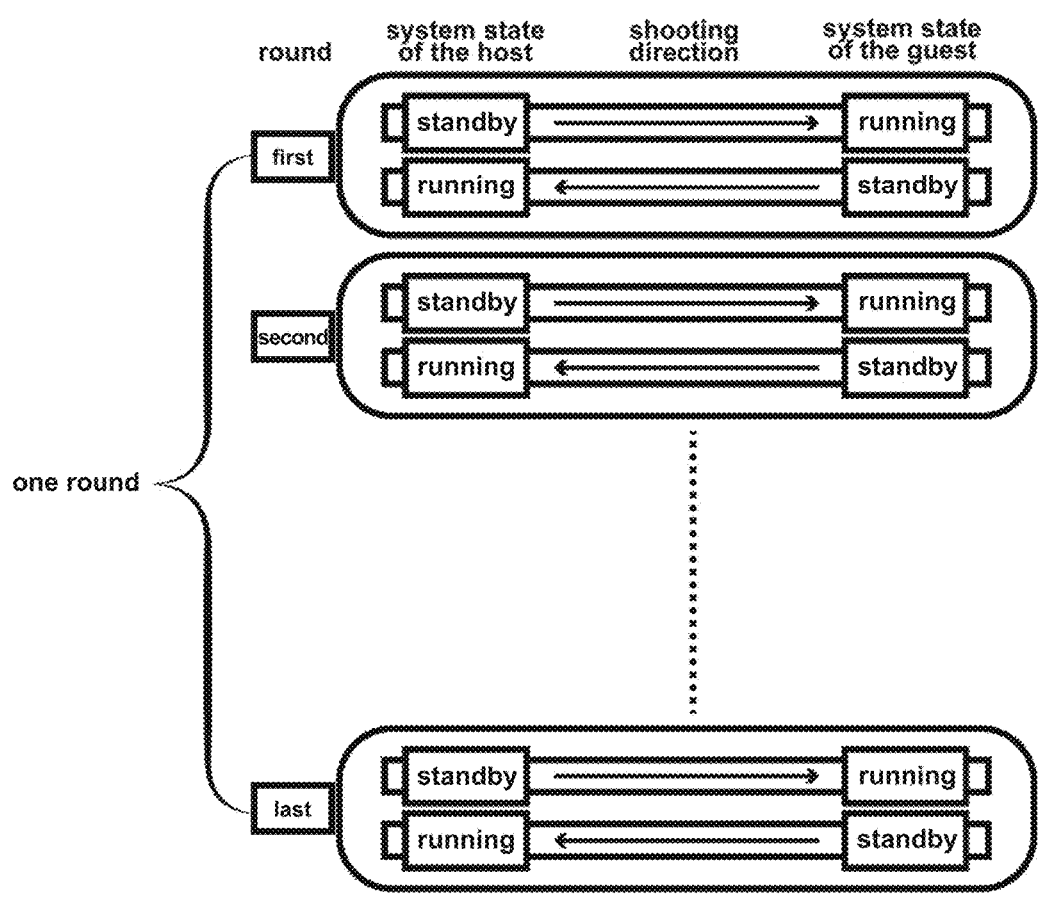
FIGS. 8A and 8B are diagrams of a working procedure of a beer pong game system according to embodiments of the present invention.
Figure 8B:
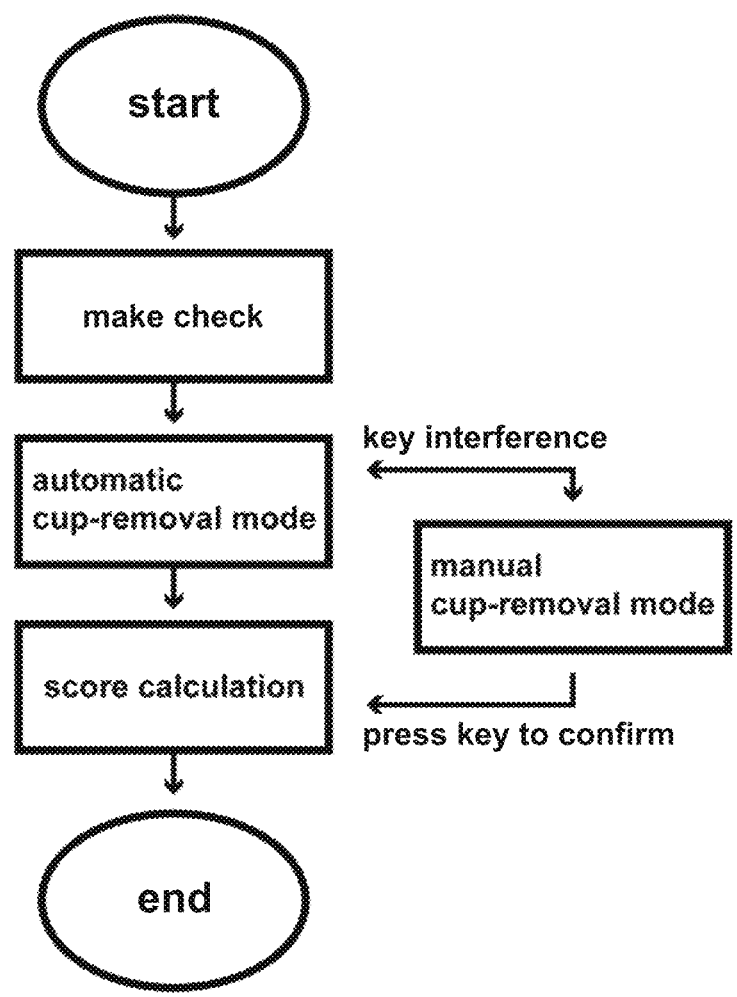

Hereinafter, a working procedure of the beer pong game system according to the embodiments of the present invention will be simply illustrated with reference to the accompanying drawings. As illustrated in FIG. 8A, a complete beer pong game consists of several rounds. In a single round, players from a host team and a guest team shoot in turn. Therefore, the beer pong game systems of the host team and the guest team are alternately in a running state and standby state. FIG. 8B is a diagram of a working procedure of a beer pong game system in a running state during a single game round. As shown in FIG. 8B, the system is first in a make detecting state, and obtains the user's landing mode by a make detecting sub-system. Next, the system enters into an automatic cup-removal mode in a cup-removal scoring state. If the user acknowledges the landing mode detected by the system and performs a cup-removal action and cup position reset according to a cup-removal operation predicted by the system, the system directly performs a scoring calculation and then terminates. If the user does not acknowledge the landing mode detected by the system, he/she will press the mode switching key to enter into the manual cup-removal mode in the cup-removal scoring state, and autonomously perform the cup-removal action and cup position reset according to game rules, and then press a confirmation button to perform a scoring calculation and terminate. It should be noted that in the manual cup-removal mode, the user may re-enter into the automatic cup-removal mode at any time by pressing the mode switching key. In the automatic cup-removal mode, the system may flicker the RGB light-emitting sheet at a position of a game cup that should be reserved according to the detected landing mode, so as to eye-catchingly prompt the user to perform the cup-removal action and to reset cups position according to the cup-removal operation predicted by the system.

Figure 9:
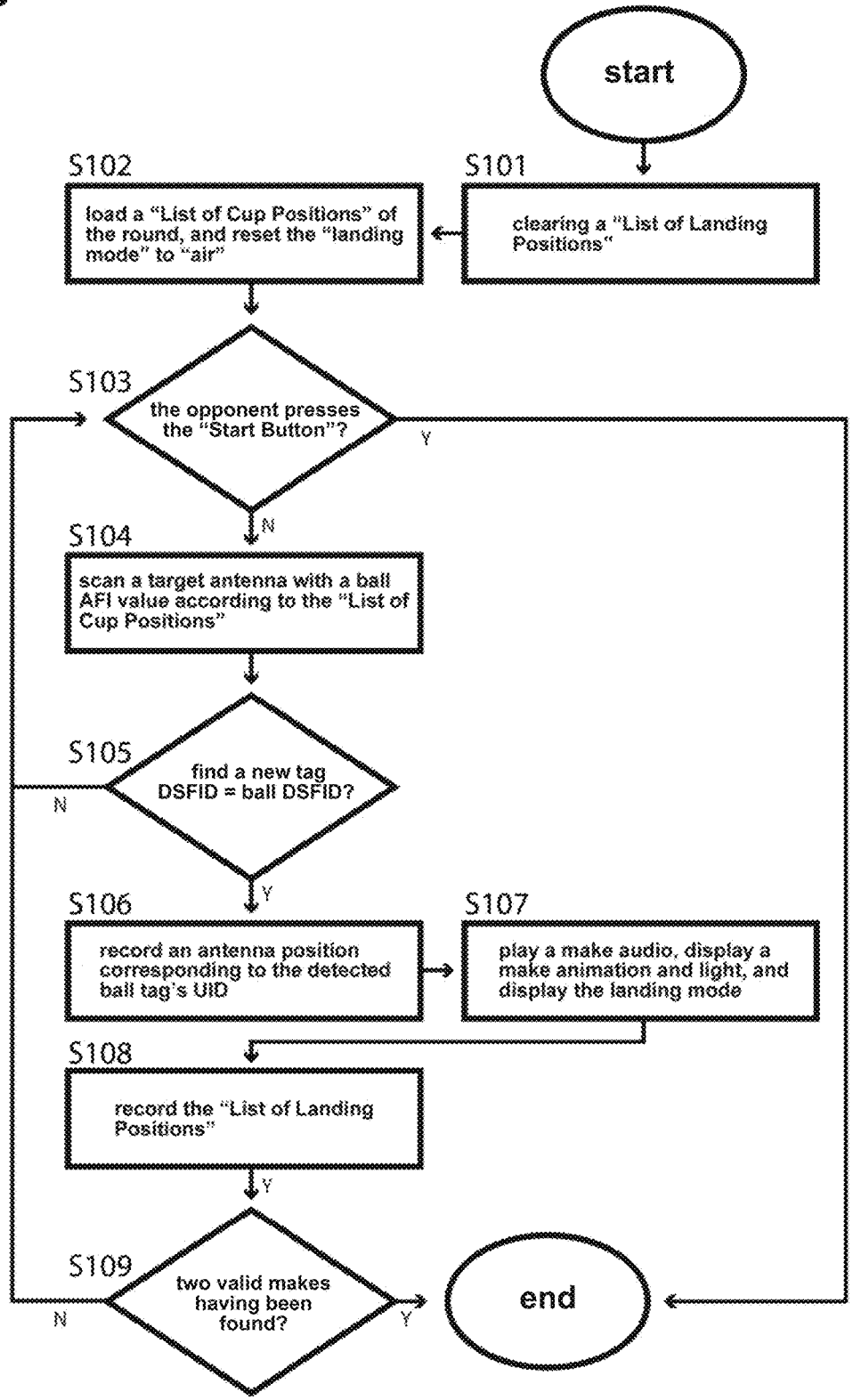
FIG. 9 is a flow chart of make detecting of a beer pong game system according to embodiments of the present disclosure.

Next, a detailed process of make detecting and cup-removal scoring will be further illustrated in detail in conjunction with the drawings. FIG. 9 is a flow chart of make detecting of a beer pong game system in a single game round. As illustrated in the figure, first, the system is initialized (S101~S102), specifically clearing a "List of Make Positions" in step S101, and meanwhile loading an initial "List of Cup Positions" in step S102, and resetting the landing mode to "Air." If this round is not a first round, the "List of Cup Positions" is a result updated by the system at the end of the immediately preceding cup-removal scoring procedure. Next, the system determines whether a player has pressed a Shoot Start key (S103). If yes (Y), the present make detection procedure is directly terminated. This determination is performed because in an actual game process, a game party possibly misses a game cup; in this exceptional case, the opponent game party needs to press the Shoot Start key to switch to a counterpart make detecting procedure.

Next, the system scans a target antenna (S104) with a ball AFI value (Application Family Identity) according to the "List of Cup Positions" loaded in step S102 and enters into the next step (S105) to determine whether a new ball tag is found in a working zone of the target antenna, specifically determining whether a DSFID value (Data Storage Format Identity) of the detected electronic tag is equal to a DSFID defined value of the game ball. If it is determined "No (N)" in step S105, the flow returns to step S103 to perform a next round of make detection cycle; if it is determined "Yes (Y)" in step S105, the system records an antenna position corresponding to the detected ball tag's UID (S106) and enters into the next step (S107) of playing a make audio, displaying a make animation and light, and displaying the landing mode. Next, the system records and updates a "List of Make Positions" (S108). In accordance with the game rules, both game parties shoot twice each round; therefore, if the game control program determines, in one make detecting cycle, that two valid makes (determined as Yes in step S109) have been found, the process ends; otherwise, the process returns to step S103 to perform next round of make detecting cycle. The above is a complete make detecting process of a beer pong game system in a single game round.

Figure 10A:
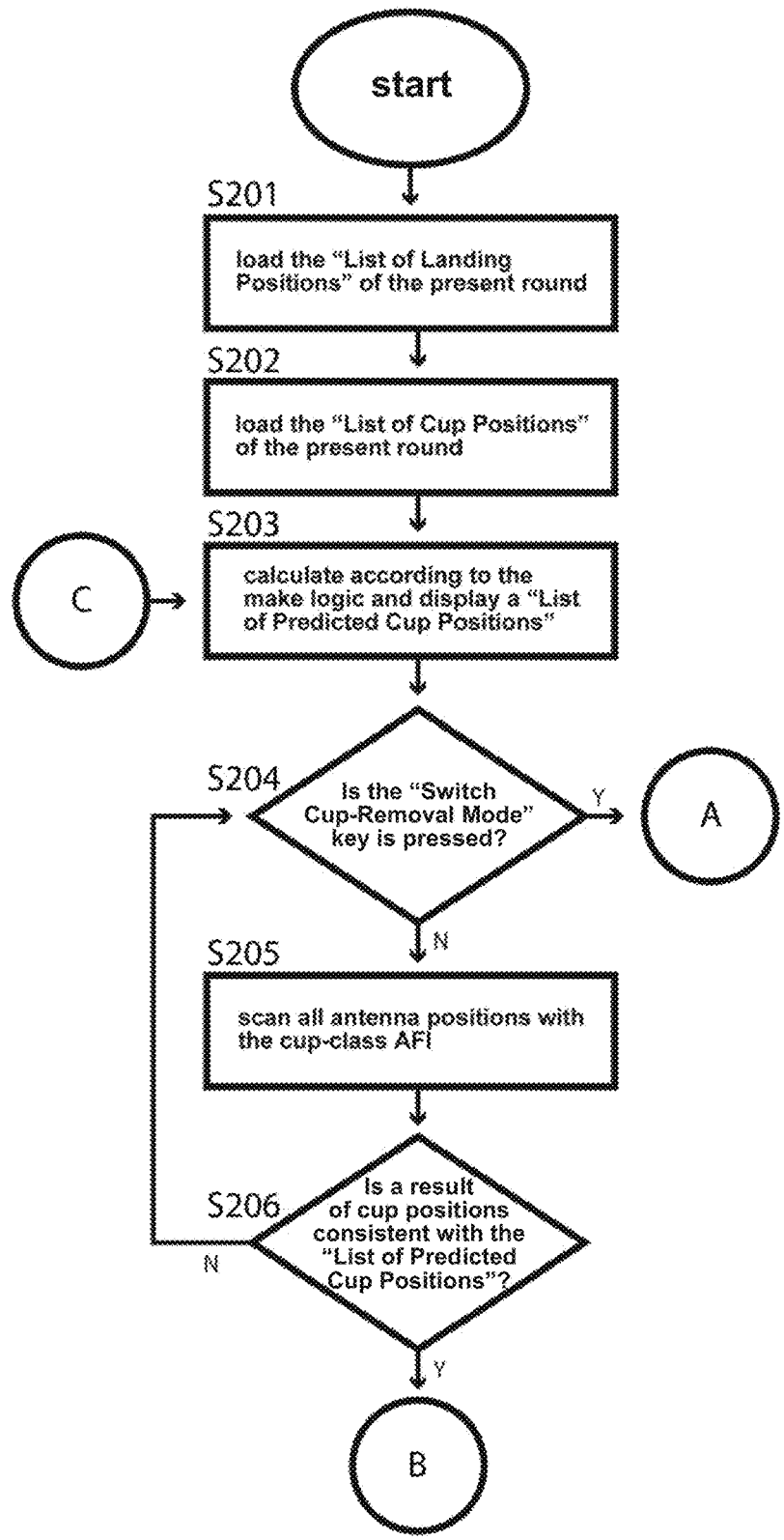
FIGS. 10A-10C are flow charts of cup-removal scoring of a beer pong game system according to embodiments of the present invention.
Figure 10B:
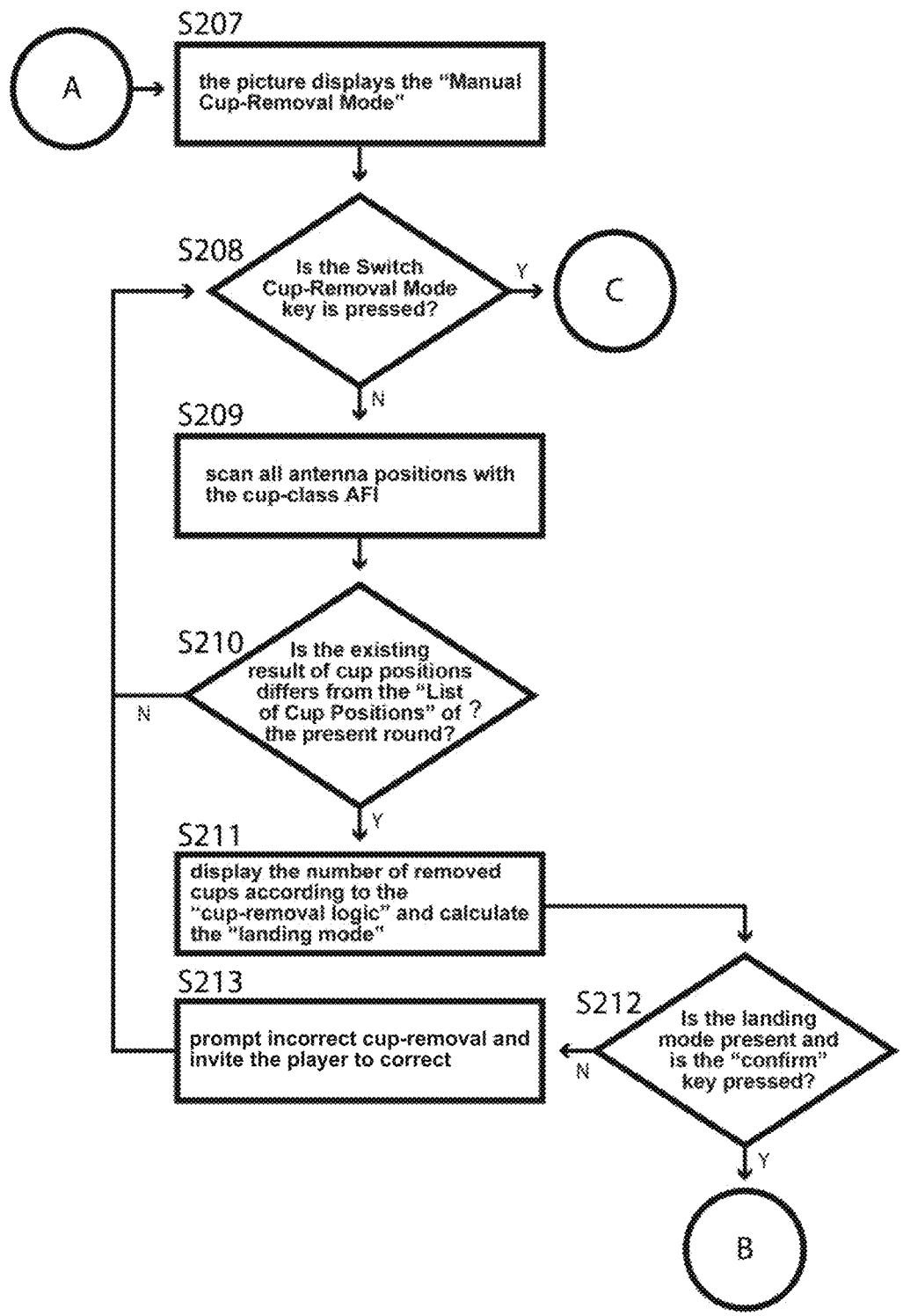
Figure 10C:
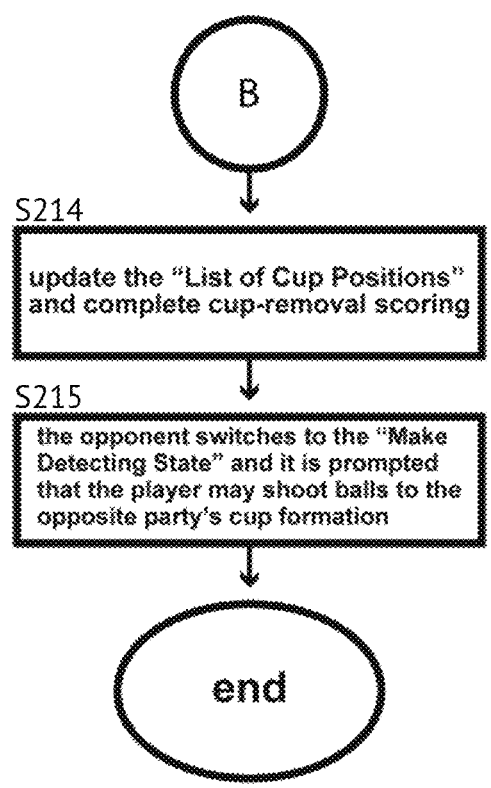

FIGS. 10A-10C are flow charts of cup-removal scoring of a beer pong game system according to embodiments of the present invention. As illustrated in the figure, firstly, the system is initialized (S201~S202), specifically loading in step S201 the "List of Make Positions" obtained in a make detecting process shown in FIG. 9 in that round, and meanwhile loading in step S202 the "List of Cup Positions" in the present round. If the present round is not the first round, the "List of Cup Positions" is a result updated by the system upon ending of the immediately preceding cup-removal scoring procedure. Then, the system calculates according to the make logic (referring to FIGS. 6A-6C) and displays a "List of Predicted Cup Positions" to prompt the user to perform a corresponding cup-removal operation (S203). Next, the system determines whether the user presses a Switch Cup-Removal Mode key (S204); if it is determined "Yes (Y)," the system enters into step S207 to switch to the manual cup-removal mode; otherwise the system enters into the next step S205 to process according to the automatic cup-removal mode. In other words, if the user does not acknowledge a make detection result and refuses to perform the cup-removal operation according to the "List of Predicted Cup Positions," the system may be switched to the manual cup-removal mode to correct the make detection error.

In step S205, the system scans all target antennas with a cup AFI value (Application Family Identity) from position 1 to position 11, and then the system enters into the next step S206 to determine whether a current result of cup positions is consistent with the "List of Predicted Cup Position"; if it is determined "Yes (Y)," the system enters into step S214 to update the "List of Cup Positions"; otherwise keeps a local cycle till the user's cup-removal operation completely conforms to the "List of Predicted Cup Positions," thereby completing the automatic cup-removal mode.

In step S207, it is displayed through a screen picture that the system enters into a manual cup-removal mode; next, the system enters into step S208 to determine whether the user presses a Switch Cup-Removal Mode key; if it is determined as "Yes (Y)," the system returns to step S203 so as to facilitate the user to return to the automatic cup-removal mode from the manual cup-removal mode at any time. If it is determined as "No (N)" in step S208, the system enters into the next step S209 so as to scan all target antennas with the cup AFI value (Application Family Identity); then the system enters into step S210 to determine whether the existing result of cup positions differs from the "List of Cup Positions" of the present round loaded in step S202; if the user does not perform a cup-removal operation, then the system returns to step S208 to perform a next round of scanning; if the user performs a cup-removal operation, the system enters into step S211 to display the number of removed cups according to a cup-removal logic (see FIGS. 7A and 7B) and infer a "landing mode." Next, in step S212, it is determined whether a corresponding cup-removal logic exists and it is checked whether the user presses a Confirm key; if it is determined as "Yes (Y)," the system enters into step S214 to update the "List of Cup Positions," thereby completing the manual cup-removal mode. If it is determined as "No (N)" in step S212, the system enters into step S213 to prompt that the cup-removal operation does not conform to the cup-removal logic and needs the player to correct, and then returns to step S208 for next round of scanning.

In step S214, the system updates the "List of Cup Positions" and completes cup-removal scoring, and then enters into the next step S215 to switch the opponent party from a standby state to a make detecting state, and prompts the player of the opponent party to shoot balls to the opposite party's cup formation. The above is a complete cup-removal scoring flow of a beer pong game system in a single game round.

In the embodiments above of the present invention, a working principle and structural details of the RFID-based cup-removal scoring subsystem have been illustrated in detail. However, those skilled in the art will easily appreciate that as a transformed example of the cup-removal scoring sub-system, other technologies, as alternative to the RFID technology, may be used to implement cup-removal scoring. A technical solution according to the transformed example of the present invention may thoroughly cast off a dependency on the RFID technology, thereby implementing a cost-effective simplified version of a beer pong game system with an automatic scoring function.

Figure 11A:
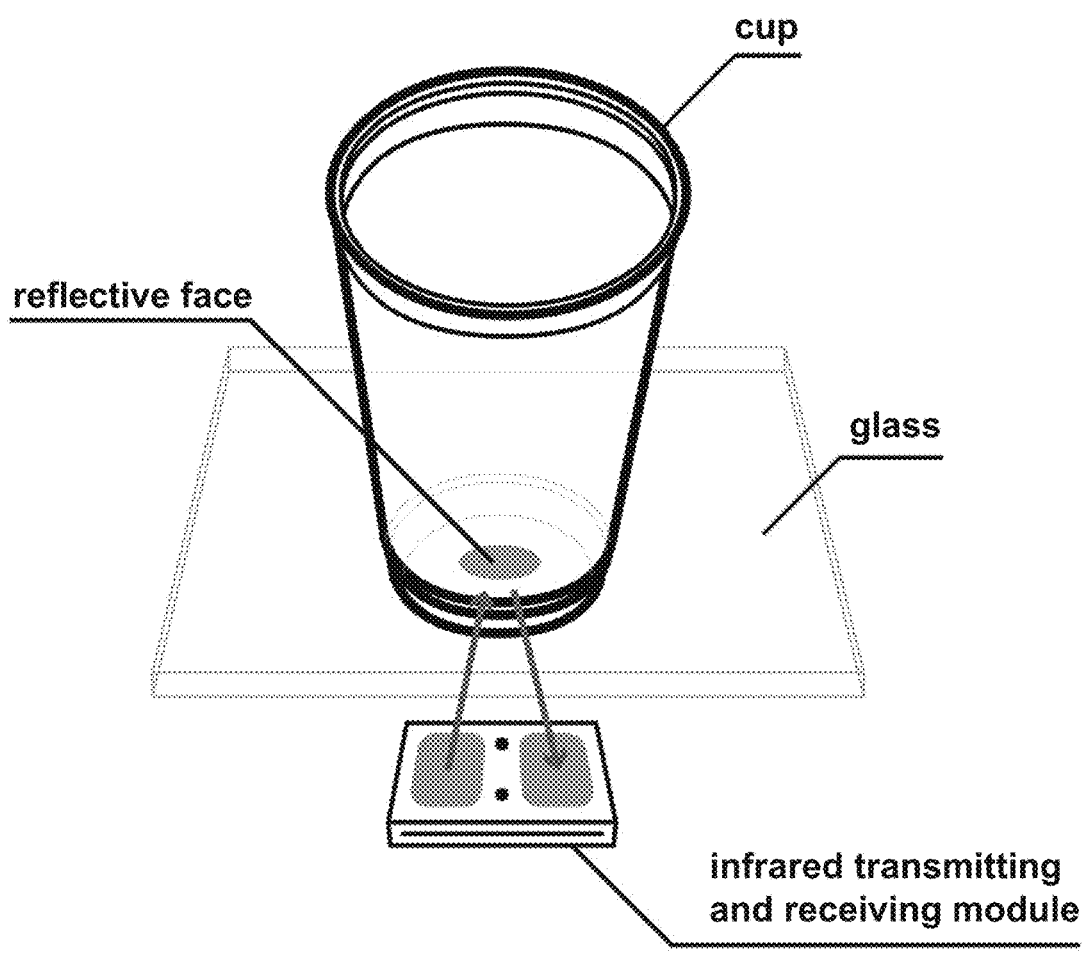
FIGS. 11A-11C are schematic diagrams of a working principle of a cup-removal scoring sub-system according to transformed embodiments of the present invention.
Figure 11B:
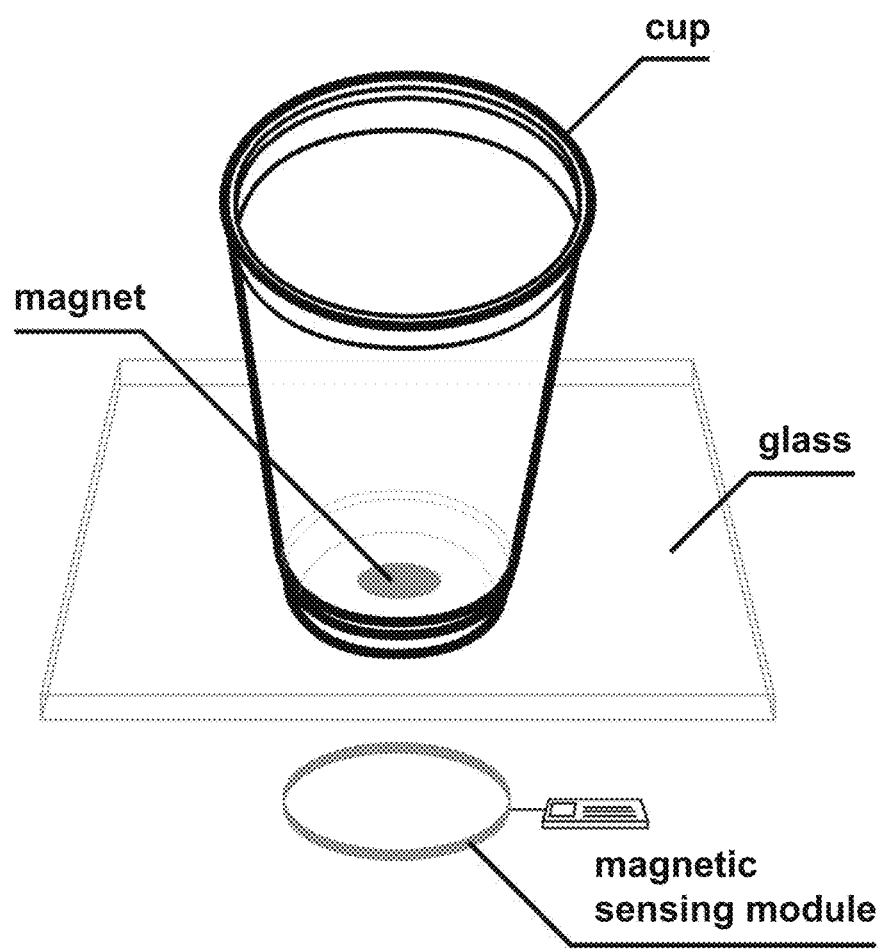
Figure 11C:
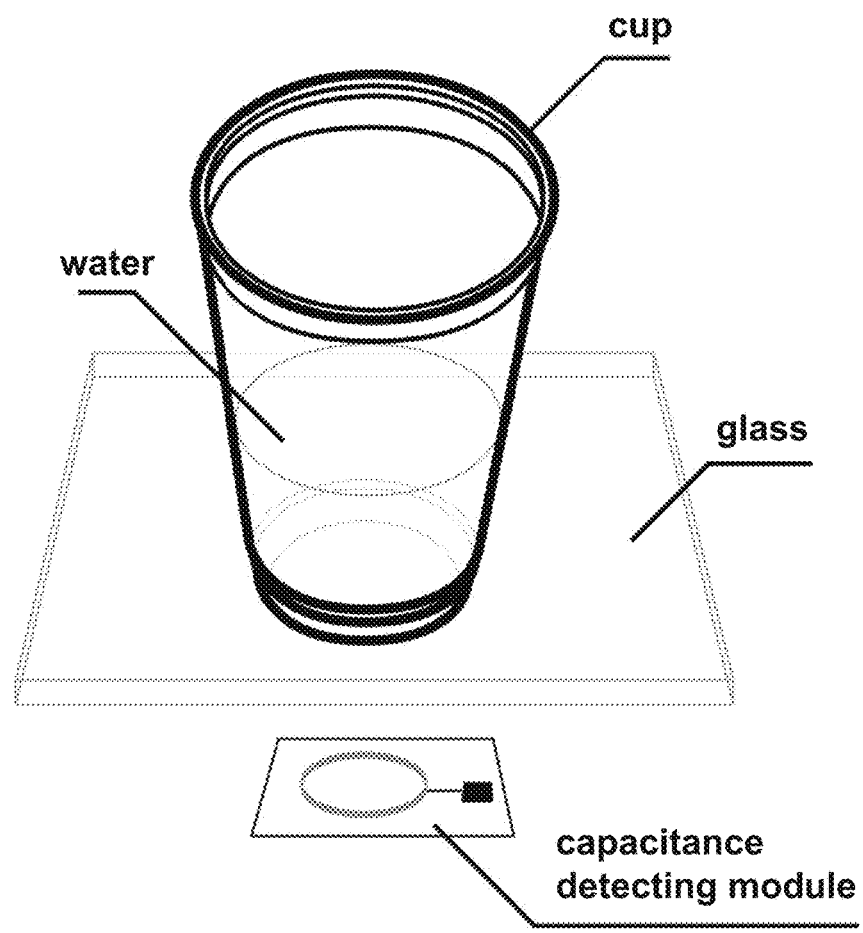

FIGS. 11A-11C are schematic diagrams of a working principle of a cup-removal scoring sub-system according to transformed embodiments of the present invention. As shown in FIG. 11A, an infrared transmitting and receiving technology is used instead of the RFID technology. Based on whether an infrared transmitting and receiving module has received a reflected light from a cup-bottom reflective face, it is determined whether a game cup exists at a to-be-detected position. Preferably, a designated data format is embedded in an infrared signal for the system to distinguish the signal from an interference source. Different materials and colors of game cups possibly have a different absorption and reflection of the infrared signal; therefore, a specific adhesive film is applied to the cup bottom to enhance the accuracy of system detection. An upward facing surface of the adhesive film applies a single-sided light shielding material to block the interference source, while the downward facing surface applies a light reflective material to reflect the infrared signal; additionally, the interference source may be filtered through a comparator. As shown in FIG. 11B, a magnetic sensing technology is used instead of the RFID technology. A magnet with a specific magnetic flux is attached to the cup bottom of a game cup, and based on whether the magnetic sensing module has sensed a magnetic flux which the magnet at the cup bottom should have, it is determined whether a game cup exists at the to-be-detected position. As illustrated in FIG. 11C, a capacitance detecting technology is adopted instead of the RFID technology. Due to existence of water in the game cup, a capacitance with a cup of water placed on a glass face has a significant measurable difference from a capacitance without a cup of water; therefore, by measuring a capacitance value above a to-be-detected position using a capacitance detecting module, it may be determined whether the game cup exists at the position. Those skilled in the art will appreciate that besides the above detecting technologies instead of the RFID technology, an electronic scale detecting technology or a pressure-sensitive detection technology may be used, or various kinds of technologies above may be combined in mutual assistance, as long as the detection technology can accurately determine whether a game cup exists at a to-be-detected position.

What have been disclosed above are only preferred embodiments of the present invention. Of course, the scope of the present invention shall not be limited thereto. therefore, equivalent variations according to the patent scope of the present application still fall within the scope of the present invention. it should be understood that the depictions above intend for illustration, not for limitation. For example, the embodiments above (and/or aspects thereof) may be combined one another to use. In addition, various alterations may be made according to the teaching of the present invention so as to be adapted to specific situations or materials without departing from the scope of the present invention. Through reading the depictions above, many other embodiments and alterations within the scope and spirit of the claims are obvious to those skilled in the art.

What is claimed is:

1. A beer pong game system comprising a game table, a plurality of game cups, and at least one game ball, the game table being equipped with an RFID reader and a plurality of RFID antennas, the plurality of RFID antennas being one-to-one correspondingly provided at a plurality of to-be-detected positions of the plurality of game cups; a first electronic tag being affixed at a bottom of each of the plurality of game cups; a second electronic tag being inlaid inside the at least one game ball; the beer pong game system being characterized by comprising:

a make detecting unit that identifies, at a predetermined to-be-detected position of the at least one game ball, the second electronic tag of the at least one game ball by scanning the plurality of RFID antennas, thereby determining a make result and prompting a first landing mode; and a cup-removal scoring unit that identifies, at the plurality of to-be-detected positions of the plurality of game cups, the first electronic tags of the plurality of game cups by scanning the plurality of RFID antennas, thereby inferring a second landing mode and correspondingly scoring.

2. The beer pong game system according to claim 1, wherein in a first round of a beer pong game, a plurality of predetermined game cups refer to all of the plurality of game cups; in a non-first-round of the beer pong game, the plurality of predetermined game cups refer to remaining game cups after a cup-removal operation in an immediately preceding round of game.

3. The beer pong game system according to claim 1 further comprising:
a cup-removal mode switching unit that causes the cup-removal scoring unit to switch between an automatic cup-removal mode and a manual cup-removal mode;
wherein in the automatic cup-removal mode, the cup-removal scoring unit requires a user to correspondingly perform a cup-removal operation according to the first landing mode prompted by the make detecting unit, and in the manual cup-removal mode, the cup-removal scoring unit allows the user to autonomously determine the cup-removal operation.

4. The beer pong game system according to claim 3, wherein the make detecting unit prompts the first landing mode according to a make logic, and the cup-removal scoring unit infers the second landing mode according to a cup-removal logic.

5. The beer pong game system according to claim 1, wherein in the case of inferring the second landing mode according to a cup-removal logic, the cup-removal scoring unit requires confirmation from the user; if the second landing mode cannot be inferred according to the cup-removal logic, the cup-removal scoring unit displays alarm information.

* * * * *